US008857459B2

(12) United States Patent
Penwell et al.

(10) Patent No.: US 8,857,459 B2
(45) Date of Patent: Oct. 14, 2014

(54) INTERNALLY POWERED EARTHQUAKE TRIGGERED AND ELECTRICALLY CONTROLLABLE SHUTOFF VALVE

(75) Inventors: Chris Penwell, Minden, NV (US); Jonathan L. Jones, Carson City, NV (US)

(73) Assignee: Transtector Systems, Inc., Hayden, ID (US)

( * ) Notice: Subject to any disclaimer, the term of this patent is extended or adjusted under 35 U.S.C. 154(b) by 240 days.

(21) Appl. No.: 13/346,635

(22) Filed: Jan. 9, 2012

(65) Prior Publication Data

US 2012/0175538 A1     Jul. 12, 2012

Related U.S. Application Data

(60) Provisional application No. 61/460,787, filed on Jan. 7, 2011.

(51) Int. Cl.
*F16K 17/36* (2006.01)
*F16K 31/44* (2006.01)
*F16K 31/46* (2006.01)

(52) U.S. Cl.
CPC ................................. *F16K 17/36* (2013.01)
USPC ................................. 137/39; 251/68; 251/74

(58) Field of Classification Search
USPC ................. 137/1, 38, 39, 15.18; 251/68, 74, 251/129.01, 129.03, 129.04, 129.15
See application file for complete search history.

(56) References Cited

U.S. PATENT DOCUMENTS

| | | | | |
|---|---|---|---|---|
| 2,591,030 A | * | 4/1952 | Versoy | 137/39 |
| 2,637,407 A | * | 5/1953 | Burk et al. | 180/287 |
| 3,244,397 A | * | 4/1966 | Fattor | 251/129.1 |
| 4,475,565 A | * | 10/1984 | Keller et al. | 137/39 |
| 5,278,454 A | * | 1/1994 | Strauss et al. | 307/64 |
| 5,782,263 A | * | 7/1998 | Isaacson et al. | 137/487.5 |
| 6,056,261 A | * | 5/2000 | Aparicio et al. | 251/129.03 |
| 6,085,772 A | * | 7/2000 | McGill et al. | 137/39 |
| 6,394,122 B1 | | 5/2002 | Sibley et al. | |
| 6,502,599 B1 | | 1/2003 | Sibley et al. | |
| 6,527,004 B1 | | 3/2003 | Sibley et al. | |
| 6,789,560 B1 | | 9/2004 | Sibley et al. | |
| 6,814,100 B1 | | 11/2004 | Sibley et al. | |
| 6,968,852 B1 | | 11/2005 | Sibley | |
| 7,104,282 B2 | | 9/2006 | Hooker et al. | |
| 2005/0044858 A1 | | 3/2005 | Hooker et al. | |

* cited by examiner

*Primary Examiner* — Kevin Lee
*Assistant Examiner* — Seth W Mackay-Smith
(74) *Attorney, Agent, or Firm* — Snell & Wilmer LLP

(57) ABSTRACT

An earthquake triggered and electronically controlled shutoff valve for allowing or preventing a flow of a fluid. The shutoff valve incorporates a weight positioned on a pedestal and disengaged from a surrounding moveable tube. Upon sufficient vibrational force, the weight moves from its resting position on the pedestal and engages with the moveable tube to block the flow of the fluid through the shutoff valve. In addition to vibrational forces, the shutoff valve may be electronically triggered via a connector electrically connected to one or more solenoids positioned within the shutoff valve. The solenoids may engage with the weight upon electrical stimulation or may engage with a moveable member coupled to the moveable tube. An energy storage unit provides power for the solenoids such that the solenoids may function in the absence of external power to the shutoff valve.

14 Claims, 8 Drawing Sheets

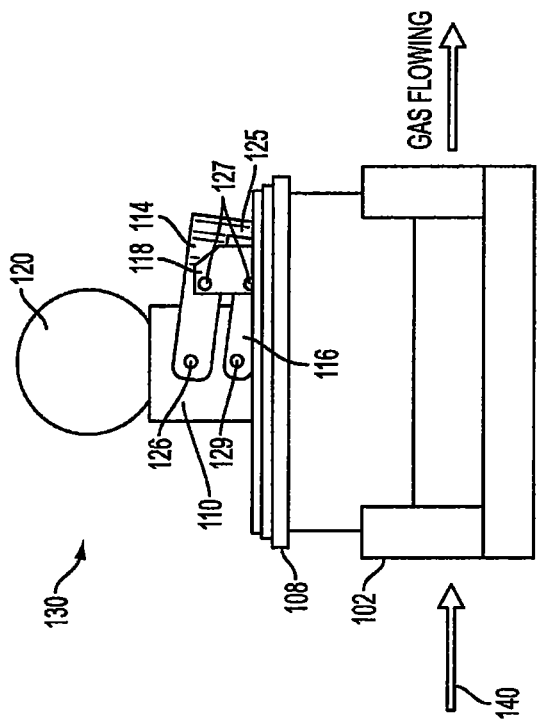
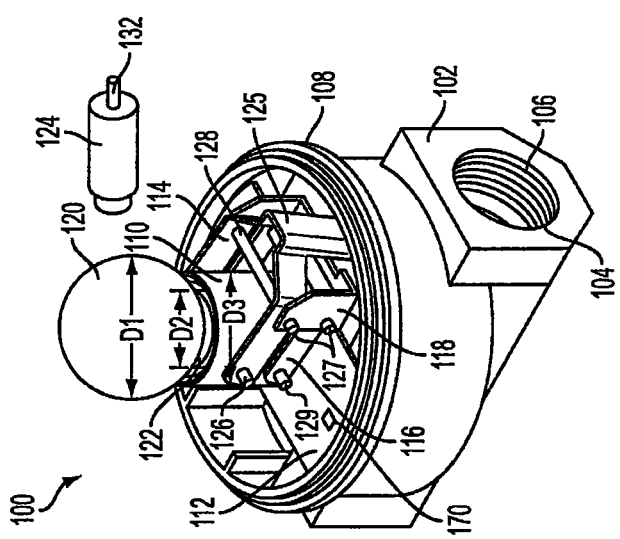
FIG. 1A
FIG. 1B

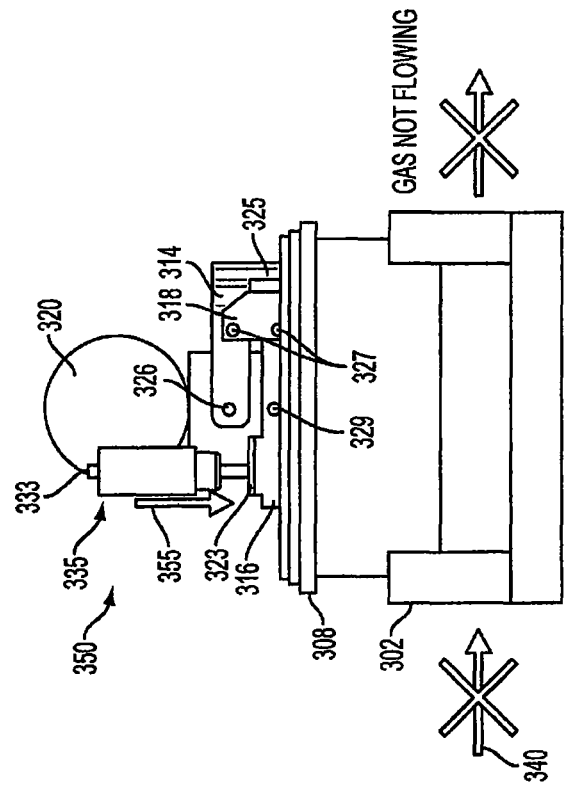
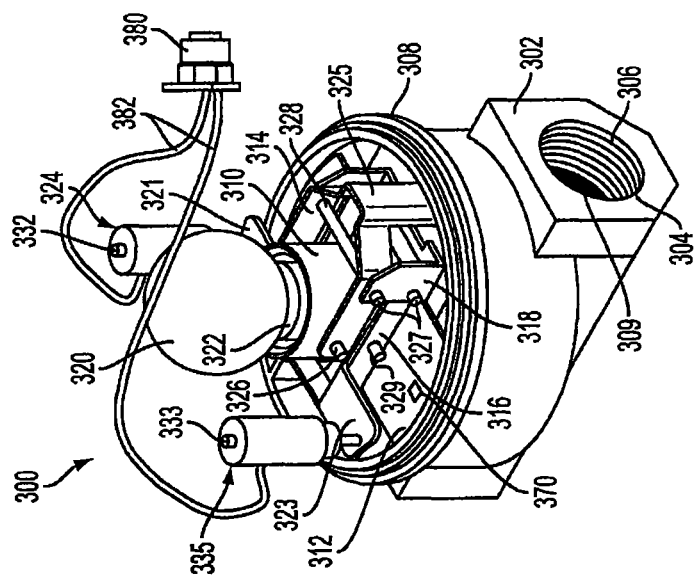

INTERNALLY POWERED EARTHQUAKE TRIGGERED AND ELECTRICALLY CONTROLLABLE SHUTOFF VALVE

CROSS REFERENCE TO RELATED APPLICATIONS

This application claims the benefit and priority of U.S. Provisional Application No. 61/460,787, filed on Jan. 7, 2011, the entire contents of which are hereby incorporated by reference.

BACKGROUND

1. Field

The present invention relates generally to automatic shut-off valves and improvements thereof. More particularly, the present invention relates to earthquake triggered shutoff valves capable of electric control and improvements thereof.

2. Description of the Related Art

Earthquakes can pose significant problems not only to the structural integrity of a building exposed to such seismic activity, but also increases the potential risk of damage to piping systems, fixtures, or appliances located throughout the structure. These risks are particularly dangerous when such systems, fixtures or appliances utilize flammable gases or fluids that may begin to leak upon a seismic event. A rupture of a natural gas pipe or feed line due to earthquake activity greatly increases the risk of fire or explosion if the flammable gas or fluid flowing through the pipe or feed line is allowed to continue flowing despite the damage to its piping system. In an effort to mitigate these risks, earthquake sensitive gas shut-off valves have been used for automatically preventing the flow of gases or fluids through the valve once the valve is acted on by a particular level of vibrational force.

However, current systems have several potential drawbacks that limit their usefulness or desirability for many users or applications. As society increasingly utilizes computers or electronic-based safety or monitoring systems for building maintenance or control, standard earthquake triggered shut-off valves have proven difficult to incorporate or integrate within the electronic safety systems already in place or to be installed. Indeed, current earthquake sensitive gas shutoff valves are typically utilized as an additional back-up system in the case of a natural disaster and may not be incorporated for monitoring or control within the context of the overall electronic safety or control system for a structure. Before the computerization of building safety systems, such a mechanical-only solution posed no additional inconvenience since the remaining system components were also mechanical in nature. However, with the advent, popularity and convenience of computerized safety systems, it has become desirable for every device operating in the safety system to be capable of monitoring or control by the electronic system. Earthquake triggered valve systems that do allow for some form of electronic control functionality require the provision of external power to the valve in order to power the electrical components within for closing or opening the valve. Such valves are inadequate for use when power has been lost at the facility as can easily occur during a seismic event and thus fail to operate as may be required.

Thus, a vibrational force sensitive shutoff valve is desired that can be easily integrated into an electronic monitoring or control system. The vibrational force sensitive shutoff valve would desirably be cheap to manufacture and capable of operating automatically upon an earthquake or via electronic control. It would be desirable for the shutoff valve to operate without requiring external power for powering its electronic components and could be electronically controlled either automatically by a connected safety system or by manual direction from a user.

SUMMARY

An apparatus and method for triggering a valve, either via a vibrational force or via electronic control, is disclosed. In one embodiment, a valve may include a base defining a cavity therein for flowing a fluid and a blocking element positioned in the cavity and having a first configuration for allowing the fluid to flow through the cavity and a second configuration for preventing the fluid from flowing through the cavity. A pedestal is coupled with the base and a tube is coupled with the base and positioned around the pedestal. A weight is positioned on the pedestal and not engaged with the tube. A solenoid is coupled with the base and a battery is coupled with the base and electrically connected with the solenoid for powering the solenoid. The blocking element is configured to change from the first configuration to the second configuration based upon electrical stimulation of the solenoid or movement of the weight due to a vibrational force.

In another embodiment, a vibrationally triggered electronically controllable shutoff valve for automatically controlling the flow of a fluid may include a housing defining a cavity therein for flowing the fluid through the cavity and a blocking member positioned in the cavity of the housing and having an open position for allowing the flow of the fluid through the cavity and a closed position for preventing the flow of the fluid through the cavity of the housing. A pedestal is disposed within the housing and a cylinder is positioned circumferentially around the pedestal and disposed within the housing. A weight is positioned on the pedestal and not engaged with the cylinder, the weight being disposed within the housing. A moveable member is coupled to the cylinder and disposed within the housing and a lever arm is coupled to the movable member and disposed within the housing. A solenoid is configured to engage with the lever arm and is disposed within the housing. A battery is electrically connected to the solenoid for powering the solenoid and is disposed within the housing. A connector is coupled to the housing and electrically connected to the solenoid. The blocking member is configured to move from the open position to the closed position if the weight engages with the cylinder or the solenoid engages with the lever arm.

In still another embodiment, a method for controlling a flow of a fluid may include the steps of providing a valve, the valve having a pedestal, a tube positioned around the pedestal, a weight positioned on the pedestal and not engaged with the tube, a lever arm, a solenoid not engaged with the lever arm and a battery electrically connected with the solenoid for powering the solenoid. The steps may further include allowing the flow of the fluid through the valve if the weight is not engaged with the tube and if the solenoid is not engaged with the lever arm, and preventing the flow of the fluid through the valve if the weight is engaged with the tube or if the solenoid is engaged with the lever arm.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 1A shows a perspective internal view of an earthquake triggered gas shutoff valve using a weight and a solenoid and in a static position according to an embodiment of the invention;

FIG. 1B shows a side interior view of the earthquake triggered gas shutoff valve of FIG. 1A in operation in the static position according to an embodiment of the invention;

FIG. 3C shows a perspective interior view of the earthquake triggered gas shutoff valve of FIG. 3A in a tripped position according to an embodiment of the invention;

FIG. 3D shows a side interior view of the earthquake triggered gas shutoff valve of FIG. 3A in operation after electronic control according to an embodiment of the invention;

DETAILED DESCRIPTION

Figure 1D:
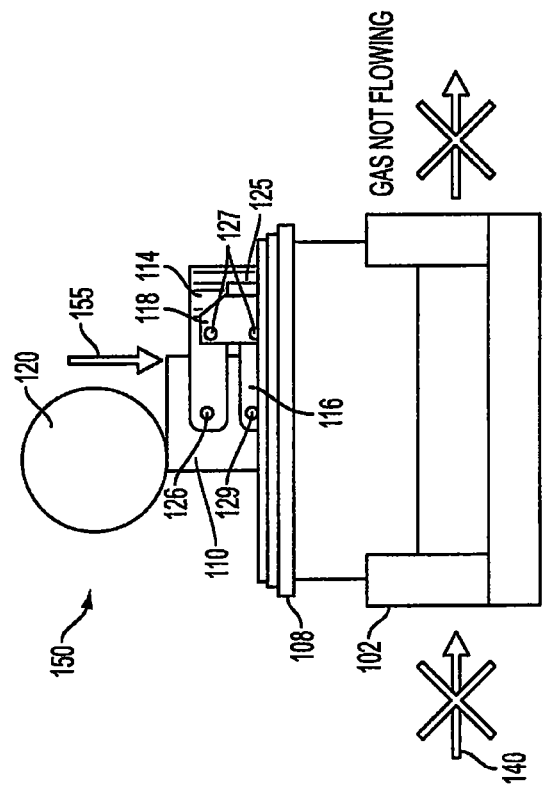
FIG. 1D shows a side interior view of the earthquake triggered gas shutoff valve of FIG. 1A in operation in the tripped position according to an embodiment of the invention.

Turning first to FIG. 1A, a perspective internal view of an earthquake triggered gas shutoff valve 100 using a weight and a solenoid and in a static position is shown. The shutoff valve 100 includes a base 102 defining a cavity 104 extending therethrough for flowing a gas or other fluid through the shutoff valve 100. The cavity 104 may have a circular shape with a threading 106 disposed along an inner surface of the cavity 104 for facilitating a connection of the shutoff valve 100 to existing piping or other equipment of a user. The base 102 may be made of stainless steel, aluminum, iron, copper, or any other type of metal or material (e.g. plastics) that may be desired for a particular design or application.

A connecting portion 108 of the base 102 is positioned above or adjacent to the cavity 104 for coupling with other components of the shutoff valve 100, as discussed in greater detail herein. The connecting portion 108 also facilitates the connection of an exterior housing (not shown) of the shutoff valve 100, as discussed in greater detail herein, for limiting a user from unintentionally interfering with one or more of the interior components of the shutoff valve 100. In an alternative embodiment, the base 102 may be formed as a part of an exterior housing of the shutoff valve 100. The connecting portion 108 may have a circular shape and be threaded along an outer or inner surface of the connecting portion 108 for rotating one or more components of an exterior housing onto the connecting portion 108. Alternatively, other connecting elements or means may be used (e.g., screws, bolts, adhesives, etc.) for connecting one or more components of an exterior housing to the connecting portion 108 of the base 102.

A supporting panel 112 is fastened to an interior of the connecting portion 108 of the base 102. Coupled to the supporting panel 112 is a vertical pedestal 122 and a vertical cylinder 110 disposed around a circumference of the pedestal 122. A weight 120 rests upon the pedestal 122 when the shutoff valve 100 is in the static position (e.g., has not been triggered by an earthquake or other electrical stimulation). The weight 120 is preferably formed in the shape of a sphere or a ball such that it may roll or move off of the pedestal 122 and engage with the cylinder 110 when sufficient force is exhibited upon the shutoff valve 100. In certain embodiments, the pedestal 122 may be formed with a spherical or other shaped indentation or opening on a top surface of the pedestal 122 for cupping a portion of the weight 120 to stabilize the weight 120 on the pedestal 122 until a sufficient force acts upon the shutoff valve 100. When the shutoff valve 100 is in the static position, the weight 120 sits on top of the pedestal 122, but does not engage with the cylinder 110.

The weight 120 has a predetermined weight (e.g., 100 grams) based upon a desired amount of force that must be experienced before the weight 120 moves from the resting position on top of the pedestal 122. The weight 120 has a first diameter D1 that may measure 38 mm. The pedestal 122 has a second diameter D2, smaller than the first diameter D1 of the weight 120, that may measure 20 mm. The cylinder 110 has a third diameter D3, larger than the second diameter D2 of the pedestal 122, but smaller than the first diameter D1 of the weight 120, that may measure 30 mm. In an alternative embodiment, varying values of the first, second and/or third diameters (D1, D2, D3) may be used and/or their sizes with respect to one another may be different (e.g., D1 may be equal or less than D3). Moreover, shapes other than cylinders may be used for either the pedestal 122 or the cylinder 110 (e.g., the pedestal 122 and/or the cylinder 110 may be tubes with other, non-circular cross sections). In certain embodiments, the weight 120 may be formed in any shape such that it is permitted to rest upon the pedestal 122 when the shutoff valve 100 is in the static position and subsequently engage with the cylinder 110 by changing position or configuration after sufficient impact has occurred.

A first bracket 114 is connected to the cylinder 110 via one or more connection points 126. The first bracket 114 includes an elongated member 125 for interfacing with a blocking member or element (not shown) of or disposed within the cavity 104 of the base 102. A moveable member or bracket 116 is similarly connected to the cylinder 110 via one or more connection points 129. The connection points (126, 129) may allow for pivotal movement of the first bracket 114 and/or the moveable member or bracket 116 when the cylinder 110 changes position or the connection points (126, 129) may rigidly secure the first bracket 114 and/or the moveable member or bracket 116 to the cylinder 110.

Both the first bracket 114 and the moveable member or bracket 116 are pivotally coupled with a connecting bracket 118 via a plurality of attachment points 127. The connection points (126, 129) and/or the attachment points 127 may be formed via one or more rods 128 that extend between a corresponding pair of connection points (126, 129) or the attachment points 127. Greater or fewer connection points (126, 129) or attachment points 127 may be utilized in an alternative embodiment. Thus, as described in greater detail herein, when the shutoff valve 100 changes from a static position to a tripped position, the first bracket 114 and the moveable member or bracket 116 are permitted to pivot with respect to the connecting bracket 118. The elongated member 125 of the first bracket 114 controls the opening or closing of a pathway through the cavity 104 of the base 102. In an alternative embodiment, the elongated member 125 may be formed or coupled with the moveable member or bracket 116, eliminating the need for the inclusion of the first bracket 114.

A solenoid 124 having a moveable rod 132 is positioned adjacent to and is disengaged from the weight 120. The solenoid 124 may be mounted to an external housing (not shown) of the shutoff valve 100 or may be mounted or otherwise coupled to the base 102 of the shutoff valve 100. A battery 170 or other energy storage device is coupled with the base 102 and is electrically connected to the solenoid 124 for powering the solenoid 124. As discussed in greater detail herein, the solenoid 124 is disengaged from the weight 120 when the shutoff valve 100 is in the static position, but may engage with the weight 120 using power from the battery 170 to cause the shutoff valve 100 to enter the tripped position.

FIG. 1B shows a side interior view of the shutoff valve 100 in operation 130 before a seismic event and before any electrical stimulation of the solenoid 124 (see FIG. 1A) (i.e., in a static position). The solenoid 124 (see FIG. 1A) is thus not engaged with the weight 120. With reference to FIG. 1A, a gas 140 or other fluid is allowed to flow through the cavity 104 of the base 102 of the shutoff valve 100. When the shutoff valve 100 is in this static position, the weight 120 rests on top of the pedestal 122 that is coupled to the base 102, but does not yet interact or engage with the cylinder 110. As shown, the first bracket 114 and the moveable member or bracket 116 are disposed in a downwardly sloping configuration from the cylinder 110 and pivotally connected with the connecting bracket 118. When in this configuration, the elongated member 125 of the first bracket 114 interfaces with a blocking member or element (not shown) of or disposed within the cavity 104 of the base 102 to allow the flow of gas 140 or other fluid through the cavity 104 of the base 102.

Figure 1C:
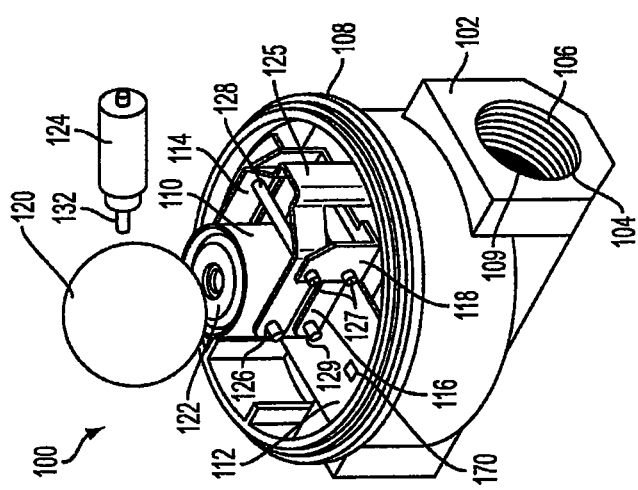
FIG. 1C shows a perspective interior view of the earthquake triggered gas shutoff valve of FIG. 1A in a tripped position according to an embodiment of the invention.

FIG. 1C next demonstrates a perspective interior view of the shutoff valve 100 when the shutoff valve 100 is in a tripped position after an earthquake or other seismic event of sufficient vibrational force has acted upon the shutoff valve 100 or the weight 120 has been engaged by the solenoid 124. As shown, the weight 120 has subsequently rolled or shifted from its static position (see FIG. 1A) atop the pedestal 122 and now engages with at least a portion of the cylinder 110. The weight 120 may have moved due to a vibrational force that acted upon the shutoff valve 100. The weight 120 may also have moved due to the moveable rod 132 of the solenoid 124 engaging with the weight 120 and pushing or forcing it to engage with the cylinder 110.

The solenoid 124 may be electrically stimulated or controlled via a control signal from an external or remote system. A connector (not shown) may be included or connected to the shutoff valve 100, for providing the electrical stimulation to the solenoid 124, for example, as discussed in greater detail for the embodiment of FIGS. 3A-3D. The battery 170 coupled with the base 102 of the shutoff valve 100 powers the engagement operation of the solenoid 124. Thus, even in the event of a power loss for a structure or to the shutoff valve 100, the shutoff valve 100 may still respond to remote electrical control signals commanding the solenoid 124 to engage the weight 120. The battery 170 may be any electrical storage device sufficient to provide adequate power to operate the solenoid 124 (e.g., chemical batteries, capacitors, solar cells, etc.). The weight 120 is configured to remain in this engaged position with the cylinder 110 once the shutoff valve 100 has entered the tripped position, even if seismic activity subsequently ends or the solenoid 124 is no longer engaged with the weight 120. In an alternative embodiment, the moveable rod 132 may remain in contact with the weight 120 at all times after engagement.

As described in more detail below, the engagement of the weight 120 with the cylinder 110 causes rotating or pivoting of the first bracket 114 and the moveable member or bracket 116 about the connecting bracket 118 at the attachment points 127 to substantially horizontal positions. The elongated member 125 of the first bracket 114 is thus raised to a higher position when in the tripped position than as seen in the static position shown in FIG. 1A. In an alternative embodiment, the sloped position of either of the first bracket 114 and/or the moveable member or bracket 116 may be of any configuration such that elongated member 125 changes position or configuration. The movement of the elongated member 125 causes a blocking element or member 109 to block the cavity 104 of the base 102 to prevent flow of a gas or fluid through the cavity 104. The blocking element or member 109 may be positioned at any location within or along the cavity 104.

Referring next to FIG. 1D, a side interior view of the shutoff valve 100 is shown in operation 150 after a seismic event or electrical stimulation of the solenoid 124 (i.e., in a tripped position). With reference to FIG. 1C, the gas 140 or other fluid is now prevented from flowing through the cavity 104 of the base 102 of the shutoff valve 100 due to the positioning of the blocking element or member 109 (see FIG. 1C). When the shutoff valve 100 is in this tripped position, the weight 120 has shifted or rolled from its resting position on top of the pedestal 122 and now engages with or otherwise exhibits a force 155 upon the cylinder 110. This movement of the weight 120 may have occurred due to sufficient seismic activity upon the shutoff valve 100 or due to electrical stimulation of the solenoid 124 that controlled the subsequent engagement of the moveable rod 132 of the solenoid 124 with the weight 120.

The force 155 by the weight 120 upon the cylinder 110 causes the cylinder 110 to move downwardly towards the base 102 of the shutoff valve 100. As the cylinder 110 changes position, the first bracket 114 and the moveable member or bracket 116 are caused to pivot at the attachment points 127 about the connecting bracket 118 due to their connection with the cylinder 110 at the connection points (126, 129). When the cylinder 110 reaches its downward-most position as a result of the force 155, both the first bracket 114 and the moveable member or bracket 116 are disposed in a substantially horizontal configuration and the elongated member 125 of the first bracket 114 interfaces with the blocking element or member 109 (see FIG. 1C) of or disposed within the cavity 104 of the base 102. The positioning of the blocking element or member 109 prevents the flow of the gas 140 or other fluid through the cavity 104 of the base 102. In this manner, the gas 140 or fluid flow can be automatically halted in the event of an earthquake that might otherwise lead to a fire, explosion, or other unwanted consequence. Moreover, the gas 140 or fluid flow can also be manually triggered or otherwise electronically controlled via the solenoid 124 even if no earthquake occurred.

Figure 2A:
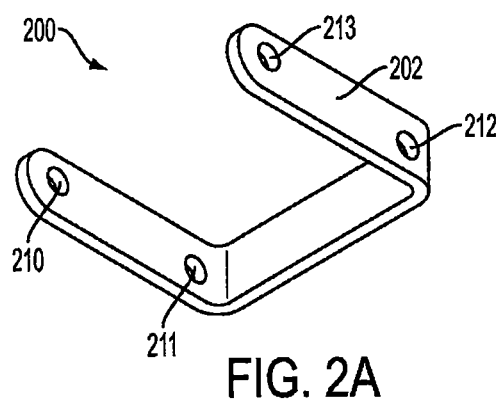
FIG. 2A shows a perspective view of a movement bracket for an earthquake triggered gas shutoff valve according to an embodiment of the invention.

Turning next to FIG. 2A, a movement bracket 200 is shown for incorporation within an earthquake triggered shutoff valve. The movement bracket 200 may be the same or similar to the moveable member or bracket 116 previously described for FIGS. 1A-1D. The movement bracket 200 has a body 202 formed in a substantially U-shaped configuration and includes a first pair of connection holes (210, 213) and a second pair of connection holes (211, 212). The first pair of connection holes (210, 213) may be used for connecting the movement bracket 200 to a moveable component (e.g., the cylinder 110 of FIGS. 1A-1D) of a shutoff valve. The second pair of connection holes (211, 212) may be used for connecting the movement bracket 200 to an immobile component of a shutoff valve (e.g., the connecting bracket 118 of FIGS. 1A-1D).

Figure 2B:
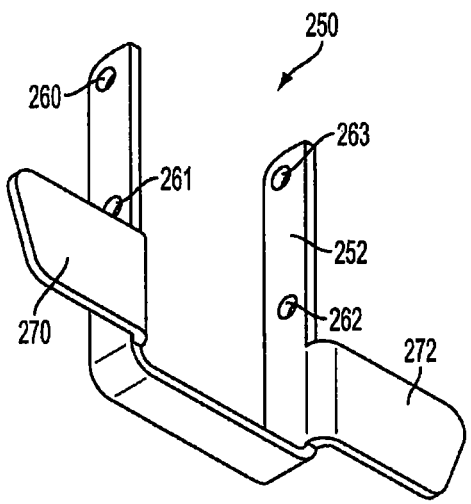
FIG. 2B shows a perspective view of an alternative movement bracket for an earthquake triggered gas shutoff valve according to an embodiment of the invention.

FIG. 2B shows an alternative movement bracket 250 for incorporation within an earthquake triggered shutoff valve in place of the movement bracket 200 discussed for FIG. 2A. The alternative movement bracket 250 has a body 252 formed in the same or similar U-shaped configuration and contains a first pair of connection holes (260, 263) and a second pair of connection holes (261, 262). The shape and placement of the alternative movement bracket 250 and/or the connection holes (261, 263, 261, 262) may allow for easy replacement of the movement bracket 200 with the alternative movement bracket 250 or vice versa in a gas shutoff valve. Thus, a user may cheaply and/or easily convert or manufacture a shutoff valve with either the movement bracket 200 or the alternative movement bracket 250.

The alternative movement bracket 250 includes a first lever arm 270 and a second lever arm 272. The lever arms (270, 272) may be manufactured either as part of the alternative movement bracket 250 or may be coupled with (e.g., welded to) the body 252 to form the alternative movement bracket 250. The lever arms (270, 272) may be substantially planar and extend outwardly from the body 252 of the alternative movement bracket 250 by a length of approximately 10 mm. The lever arms (270, 272) may be used for engaging with a portion of one or more solenoids, as discussed in greater detail herein. The longer the extension of the lever arms (270, 272) from the body 252, the greater the amount of leverage that may be obtained through engagement with a solenoid, as discussed in greater detail herein. In an alternative embodiment, greater or fewer lever arms may be utilized for the alternative movement bracket 250.

Figure 3B:
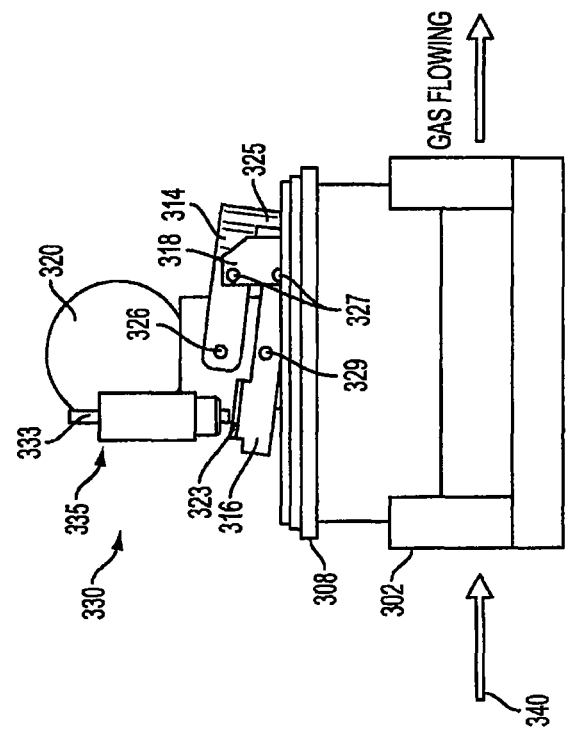
FIG. 3B shows a side interior view of the earthquake triggered gas shutoff valve of FIG. 3A in operation before electronic control according to an embodiment of the invention.
Figure 3A:
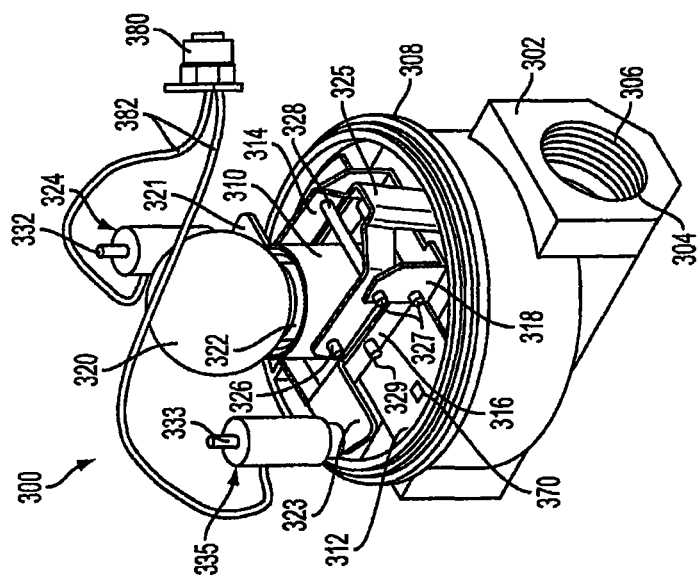
FIG. 3A shows a perspective interior view of an earthquake triggered gas shutoff valve using a weight and a solenoid and in a static position according to an embodiment of the invention.

FIG. 3A shows a perspective interior view of an earthquake triggered gas shutoff valve 300 using a solenoid and a weight and in a static position. Generally, the shutoff valve 300 may have certain structure and functional features that are similar to those of the shutoff valve 100, described above for FIGS. 1A-1D. One skilled in the art will readily understand and appreciate these similar structure and features by referencing the previous discussion. As such, the detailed description of the earthquake gas shutoff valve 300 for FIGS. 3A-3D may not be repeated in its entirety in the following sections. However, in spite of these similar features, the shutoff valve 300 may be distinguished from the shutoff valve 100 based primarily on the alternative solenoid operation for controlling a flow through the shutoff valve 300.

The shutoff valve 300 includes a base 302 defining a cavity 304 extending there through for flowing a gas or other fluid through the shutoff valve 300. The cavity 304 may have a circular shape with a threading 306 disposed along an inner surface of the cavity 304 and the base 302 may be made of any metal or material desired for a particular design or application. A connecting portion 308 (e.g., circular in shape) of the base 302 is positioned above or adjacent to the cavity 304 for coupling with other internal or external components of the shutoff valve 300, as discussed in greater detail herein. A supporting panel 312 is fastened to an interior portion of the connecting portion 308 of the base 302 and is coupled with and/or supports a vertical pedestal 322 and a vertical cylinder 310 disposed around a circumference of the pedestal 322.

A weight 320 rests upon the pedestal 322 when the shutoff valve 300 is in the static position (e.g., not been triggered by an earthquake or other sufficient vibrational force) and is preferably formed in the shape of a sphere such that it may roll or move off of the pedestal 322 and engage with the cylinder 310 when sufficient vibrational force is exhibited upon the shutoff valve 300. When the shutoff valve 300 is in the static position, the weight 320 sits on top of the pedestal 322, but does not engage with the cylinder 310. Dimensions or characteristics of the weight 320, the pedestal 322 and/or the cylinder 310 may be the same or similar to those discussed above for FIGS. 1A-1D.

A first bracket 314 is connected to the cylinder 310 via one or more connection points 326 and includes an elongated member 325 for interfacing with a blocking member or element (not shown) of or disposed within the cavity 304 of the base 302. A moveable member or bracket 316 is similarly connected to the cylinder 310 via one or more connection points 329. The connection points (326, 329) may allow for pivotal movement of the first bracket 314 and/or the moveable member or bracket 316 when the cylinder 310 changes position or the connection points (326, 329) may rigidly secure the first bracket 314 and/or the moveable member or bracket 316 to the cylinder 310. Both the first bracket 314 and the moveable member or bracket 316 are pivotally coupled with a connecting bracket 318 via a plurality of attachment points 327. The connection points (326, 329) and/or attachment points 327 may be formed via one or more rods 328 that extend between a corresponding pair of connection points (326, 329) or attachment points 327. Greater or fewer connection points (326, 329) or attachment points 327 may be utilized in an alternative embodiment.

The moveable member or bracket 316 is formed or otherwise coupled with a first lever arm 321 and a second lever arm 323. The lever arms (321, 323) extend from the movement bracket 316 and have a planar configuration. A first solenoid 324 and a second solenoid 335 are positioned above and adjacent to the first lever arm 321 and the second lever arm 323, respectively. A battery 370 or other energy storage device is coupled with the base 302 and is electrically connected to the solenoids (324, 335) for powering the solenoids. In an alternative embodiment, a plurality of batteries may be used and/or each battery may correspond to a separate solenoid.

A connector 380 is connected to each of the first solenoid 324 and the second solenoid 335 via wiring 382 for providing a control signal to electrically stimulate the first and/or second solenoids (324, 335) to engage with the moveable member or bracket 316, as described in greater detail below. A first moveable rod 332 of the first solenoid 324 is configured to move or change position such that the first moveable rod 332 may be disengaged from the moveable member or bracket 316 or engage with the moveable member or bracket 316 by contacting the first lever arm 321 of the moveable member or bracket 316. Similarly, a second moveable rod 333 of the second solenoid 335 is configured to move or change position such that the second moveable rod 333 may be disengaged from the moveable member or bracket 316 or engage with the moveable member or bracket 316 by contacting the second lever arm 323 of the movable member or bracket 316. In an alternative embodiment, only one solenoid may be used. Use of a single solenoid may help reduce manufacturing cost, but provide less reliability in the form of a backup if the single solenoid fails.

FIG. 3B shows a side interior view of the shutoff valve 300 in operation 330 before electronic control of the solenoids (324, 335) or seismic activity (i.e., in a static position). With reference to FIG. 3A, a gas 340 or other fluid is allowed to flow through the cavity 304 of the base 302 of the shutoff valve 300. When the shutoff valve 300 is in this static position, the weight 320 rests on top of the pedestal 322 that is coupled to the base 302, but does not yet interact or engage with the cylinder 310. Moreover, the first moveable rod 332 of the first solenoid 324 is disengaged from the first lever arm 321 and the second moveable rod 333 of the second solenoid 335 is disengaged from the second lever arm 323. Thus, the solenoids (324, 335) are disengaged from the moveable member or bracket 316 when the shutoff valve 300 is in the static position. The first bracket 314 and the moveable member or bracket 316 are disposed in a downwardly sloping configuration from the cylinder 310 and pivotally connected with the connecting bracket 318. When in this configuration, the elongated member 325 of the first bracket 314 interfaces with a blocking element or member (not shown) of or disposed within the cavity 304 of the base 302 to allow the flow of the gas 340 or other fluid through the cavity 304 of the base 302.

FIG. 3C next demonstrates a perspective interior view of the shutoff valve 300 when the shutoff valve 300 is in a tripped position after electronic control of the shutoff valve 300. As shown, a sufficient vibrational force has not acted upon the shutoff valve 300 because the weight 320 remains at rest upon the pedestal 322 and has not engaged with the cylinder 310. However, the shutoff valve 300 has been electronically controlled to the tripped position via the solenoids (324, 335). As described in more detail below, the first moveable rod 332 of the first solenoid 324 has extended towards the first lever arm 321 of the moveable member or bracket 316. Similarly, the second moveable rod 333 of the second solenoid 335 has extended towards the second lever arm 323 of the moveable member or bracket 316.

An electric signal transmitted from the connector 380 and through the associated wiring 382 controls the extension of the first moveable rod 332 and/or the second moveable rod 333. Thus, through electronically controlling a configuration of the solenoids (324, 335) to engage with the lever arms (321, 323), the moveable member or bracket 316 may be caused to rotate or pivot about the connecting bracket 318. Upon such engagement, the moveable member or bracket 316 exhibits a downward force on the cylinder 310 and causes a similar rotation or pivot of the first bracket 314. The elongated member 325 of the first bracket 314 is therefore raised to a higher position than its static position shown in FIG. 3A. A blocking member or element 309 interacts with the elongated member 325 and blocks the cavity 304 of the base 302 when the elongated member 325 moves to the higher position.

Referring next to FIG. 3D, a side interior view of the shutoff valve 300 is shown in operation 350 after electronic control of the solenoids (324, 335) (i.e., in a tripped position). With reference to FIG. 3C, the gas 340 or other fluid is now prevented from flowing through the cavity 304 of the base 302 of the shutoff valve 300 due to the positioning of the blocking member or element 309 (see FIG. 3C). When the shutoff valve 300 is in this tripped position, the weight 320 may not have moved from its position on the pedestal 322 and may not have engaged the cylinder 310 if sufficient vibrational force has not been exhibited upon the shutoff valve 300. However, the shutoff valve 300 may still be electronically controlled to the tripped position via the first moveable rod 332 of the first solenoid 324 and/or the second moveable rod 333 of the second solenoid 335 being commanded from a first (i.e., disengaged) to a second (i.e., engaged) position with the first lever arm 321 and/or the second lever arm 323, respectively.

The force 355 exhibited on the lever arms (321, 323) by the solenoids (324, 335) causes the moveable member or bracket 316 to exhibit a corresponding force upon the cylinder 310 at the connection points 329 and pivot at the attachment points 327 about the connecting bracket 318. The cylinder 310 moves downward in response and causes the first bracket 314 to similarly pivot at the attachment points 327 about connecting bracket 318 due to the connection of the first bracket 314 to the cylinder 310 at the connection points 326. When the solenoids (324, 335) are fully extended and/or the cylinder 310 reaches its downward-most position, both the first bracket 314 and the moveable member or bracket 316 are disposed in a substantially horizontal configuration and the elongated member 325 of the first bracket 314 interfaces with the blocking member or element 309 of or disposed within the cavity 304 of the base 302 to block flow through the shutoff valve 300.

In this manner, the gas 340 or fluid flow can be selectively halted by a user of the shutoff valve 300 by electronically controlling the solenoids (324, 335). In an alternative embodiment, the solenoids (324, 335) may be electronically controlled to position the blocking member or element 309 to any of a variety of intermediary positions in order to restrict the amount of flow allowed through the cavity 304 of the shutoff valve 300 rather than block flow completely. In this manner, the shutoff valve 300 may operate as a flow restriction device rather than only a two position ON/OFF flow blocking device. A linear motor may be utilized in replacement or in addition to the solenoids (324, 335) in an alternative embodiment to facilitate such functionality. In another embodiment, the shutoff valve 300 may be configured to transmit an indicator signal representative of either the static position or the tripped position so a user can electronically monitor the state of the shutoff valve 300. In still another embodiment, the shutoff valve 300 may provide a visual indication of its state to a user (e.g., a light, transparent housing, etc.).

A user may manually direct the closure of the shutoff valve 300 by interfacing with the solenoids (324, 325) through the connector 380 or the solenoids (324, 325) may be controlled via a signal automatically transmitted by other connected components or equipment of a user's computer or electrical safety system via the connector 380. In an alternative embodiment, the solenoids (324, 325) may be configured to be disengaged with the moveable member or bracket 316 when an electrical signal is present and engage with the moveable member or bracket 316 when the electrical signal is absent, thus incorporating fail-safe functionality in the event of remote power loss of the control signal. In an alternative embodiment, any number of solenoids or batteries may be used in the shutoff valve 300.

The connector 380 may be selected to have any of a number of pins or sockets in order to appropriately control and/or trigger the solenoids (324, 325) of the shutoff valve 300. The solenoids (324, 335) use the power provided from the battery 370 to engage with the lever arms (321, 323) in response to the control or triggering signal received from the connector 380. In one embodiment, the battery 370 may be capable of storing a sufficient amount of energy for powering the solenoids (324, 335) for 30 days before requiring connection to external power for recharging the battery 370. A trickle charger may be used to maximize the charge of the battery 370. To increase the efficiency of the battery 370, engagement of the solenoids (324, 335) with the lever arms (321, 323) may be at a location close to the perimeter or outer edge of the lever arms for increased leverage by the solenoids (324, 335) at lower power consumption.

In addition to electrical stimulation of the solenoids (324, 335), the gas 340 or fluid flow can also be automatically halted in the event of an earthquake without electrical stimulation of the solenoids (324, 335), and thus may provide a backup shutoff feature in the event of seismic activity. In one embodiment, if the weight 320 moves from resting on top of the pedestal 322 and disengaged from the cylinder 310 to an engaged position with the cylinder 310, a feedback loop may be implemented to sense or detect the changed position of the weight 320 and automatically engage the solenoids (324, 335) with the moveable member or bracket 316. Thus, in the event of seismic activity which may undesirably cause malfunction of the shutoff valve 300 (i.e., tipping or displacing it from its normal operating position), the solenoids (324, 335) may act as a backup engagement mechanism if the weight 320 subsequently ceases to exhibit a force upon the cylinder 310 after moving from its engaged position with the cylinder 310.

Figure 4A:
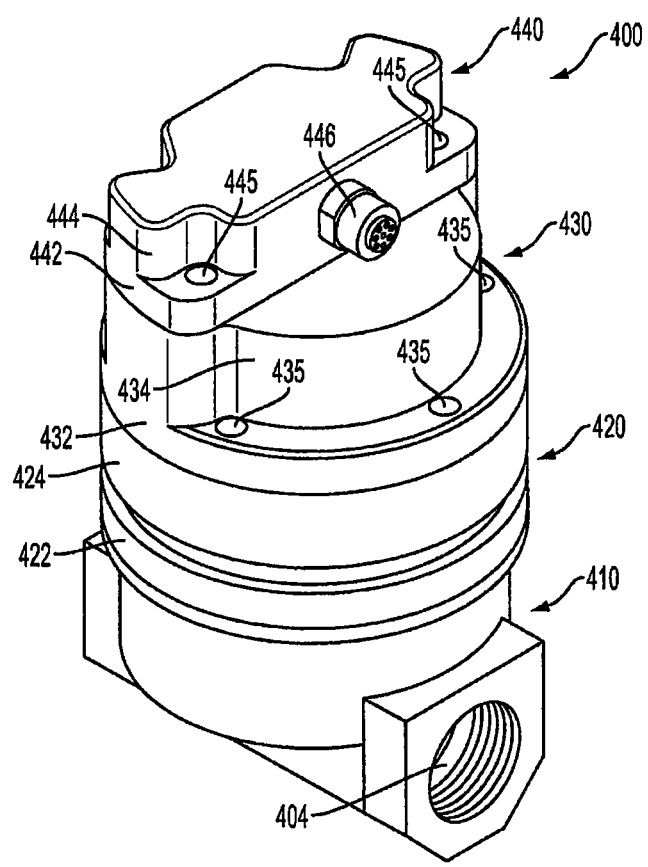
FIG. 4A shows a perspective exterior view of an earthquake triggered gas shutoff valve using a weight and a solenoid according to an embodiment of the invention.

Turning now to FIG. 4A, a perspective exterior view of an earthquake triggered gas shutoff valve 400 using a solenoid and a weight is shown. A base portion 410, an adapter portion 420, a component portion 430 and a wiring portion 440 make up a housing for the shutoff valve 400. Various of the same or similar components described above for FIGS. 1A-1D or FIGS. 3A-3D may be coupled or housed within certain of the housing portions (410, 420, 430, 440). By shielding the various components from a user of the shutoff valve 400, unintended manipulation or interference with the interior components by the user or the surrounding environment helps ensure reliable operation of the shutoff valve 400.

The base portion 410 includes the cavity 404 for flowing a gas or other fluid through the shutoff valve 400. The adapter portion 420 includes a base connecting segment 422 for coupling with the base portion 410 and a first component connecting segment 424 for coupling with the component portion 430. The component portion 430 includes an adapter connecting segment 432 for coupling with the adapter portion 420 and may include a plurality of holes 435 that align with holes in the first component connecting segment 424 for screwing or otherwise fastening the adapter connecting segment 432 with the adapter portion 420. The component portion 430 also includes a middle segment 434 with a sufficient interior volume for containing one or more interior components (e.g., a solenoid, weight, etc.) and for coupling with the wiring portion 440. The wiring portion 440 includes a second component connecting segment 442 and may include a plurality of holes 445 for coupling with the component portion 430, the same or similar to the holes 435 of the adapter connecting segment 432. The wiring portion 440 also includes a wire management segment 444 for containing and routing wires from a connector 446 connected to the wiring portion 440 to any of a variety of interior components (e.g., a solenoid).

Figure 4B:
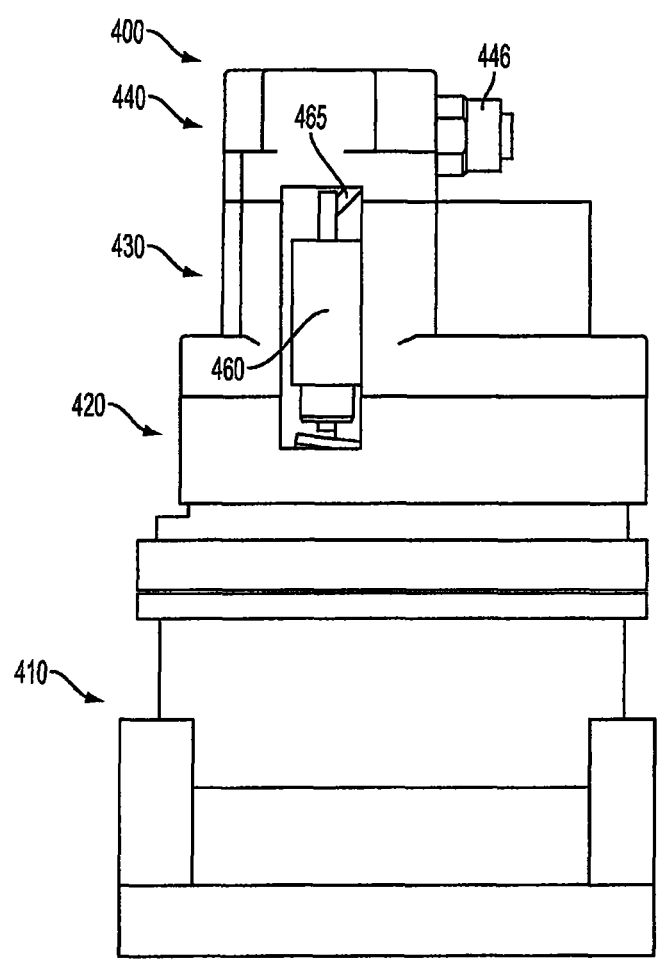
FIG. 4B shows a side exterior cutaway view of the earthquake triggered gas shutoff valve of FIG. 4A according to an embodiment of the invention.
Figure 4C:
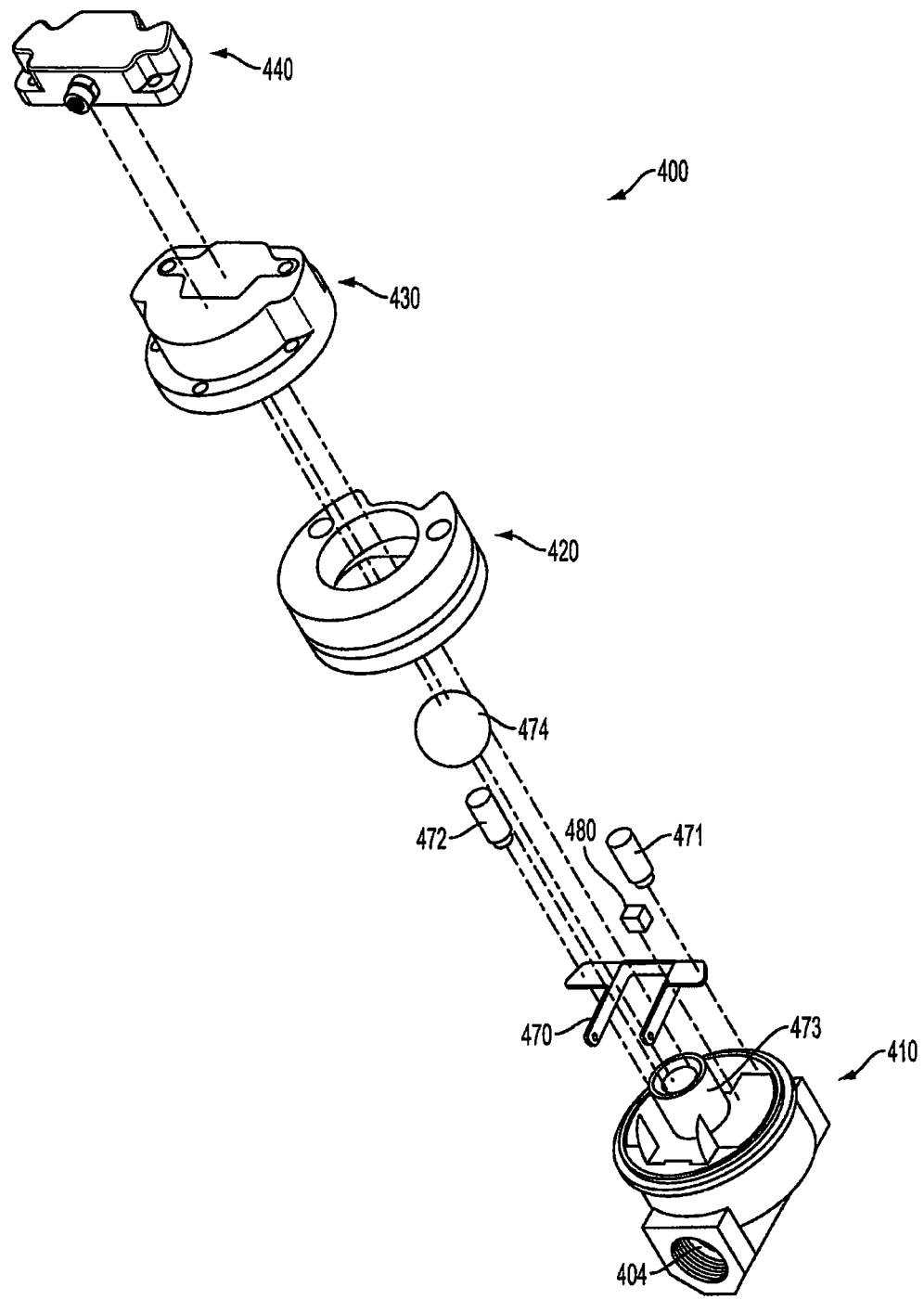
FIG. 4C shows a disassembled perspective view of the earthquake triggered gas shutoff valve of FIG. 4A according to an embodiment of the invention.

FIG. 4B shows a side exterior cutaway view of the shutoff valve 400 and demonstrates at least the incorporation of a solenoid 460 disposed within the housing for operation of the shutoff valve 400. The connector 446 is electrically connected to the solenoid 460 via one or more wires 465 that extend between the connector 446 and the solenoid 460 within the housing. FIG. 4C shows a disassembled perspective view of the shutoff valve 400 and demonstrates the incorporation of two solenoids (471, 472), a moveable member or bracket 470, a cylinder 473, a weight 474 and a battery or energy storage unit 480 for containment within various of the housing portions (410, 420, 430, 440). The connection of the housing portions (410, 420, 430, 440) to one another forms the complete exterior housing of the shutoff valve 400 with both earthquake-triggered functionality and electronic control functionality.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A valve comprising:
    a base defining a cavity therein for allowing a fluid to flow;
    a pedestal coupled with the base;
    a tube coupled with the base and positioned around the pedestal;
    a weight positioned on the pedestal and not engaged with the tube;
    a solenoid coupled with the base;
    a battery coupled with the base and electrically connected with the solenoid for powering the solenoid;
    a blocking element positioned in the cavity and having a first configuration for allowing the fluid to flow through the cavity and a second configuration for preventing the fluid from flowing through the cavity, the blocking element configured to change from the first configuration to the second configuration based upon electrical stimulation of the solenoid or movement of the weight due to a vibrational force; and
    a moveable member coupled with the tube and configured to engage with the solenoid after the electrical stimulation of the solenoid,
    wherein the blocking element is configured to change from the first configuration to the second configuration if the solenoid engages with the moveable member and the weight is not engaged with the tube.

2. The valve of claim 1 wherein the moveable member includes a lever arm, the lever arm configured to engage with the solenoid after the electrical stimulation of the solenoid.

3. The valve of claim 1 wherein the solenoid is configured to engage with the moveable member at a location substantially near a perimeter of the moveable member for increasing leverage.

4. The valve of claim 1 wherein the blocking element is configured to change from the first configuration to the second configuration if the weight engages with the tube and the solenoid is not engaged with the moveable member.

5. The valve of claim 1 further comprising a second solenoid coupled with the base, the second solenoid configured to engage with the moveable member after electrical stimulation of the second solenoid.

6. The valve of claim 1 wherein the solenoid is configured to engage with the weight after electrical stimulation of the solenoid for moving the weight to engage with the tube.

7. The valve of claim 1 further comprising a connector coupled with the base and electrically connected to the solenoid for providing the electrical stimulation of the solenoid.

8. The valve of claim 1 wherein the weight is substantially shaped in the form of a sphere.

9. A vibrationally triggered electronically controllable shutoff valve for automatically controlling the flow of a fluid comprising:

a housing defining a cavity therein for flowing the fluid through the cavity;

a pedestal disposed within the housing;

a cylinder positioned circumferentially around the pedestal and disposed within the housing;

a weight positioned on the pedestal and not engaged with the cylinder, the weight disposed within the housing;

a moveable member coupled to the cylinder and disposed within the housing;

a lever arm coupled to the movable member and disposed within the housing;

a solenoid configured to engage with the lever arm and disposed within the housing;

a battery electrically connected to the solenoid for powering the solenoid and disposed within the housing;

a connector coupled to the housing and electrically connected to the solenoid; and a blocking member positioned in the cavity of the housing and having an open position for allowing the flow of the fluid through the cavity and closed position for preventing the flow of the fluid through the cavity, wherein the blocking member is configured to move from the open position to the closed position if the solenoid engages with the lever arm.

10. The shutoff valve of claim 9 wherein the battery comprises a capacitor for storing electrical energy.

11. The shutoff valve of claim 9 further comprising:

a second lever arm coupled to the moveable member and disposed within the housing; and a second solenoid configured to engage with the second lever arm and disposed within the housing.

12. The shutoff valve of claim 9 wherein the lever arm has a planar configuration.

13. The shutoff valve of claim 9 wherein the solenoid is configured to engage with the lever arm at a location near an outer edge of the lever arm for increasing leverage.

14. The shutoff valve of claim 9 further comprising a threading positioned along an interior surface of the cavity of the housing.

* * * * *